United States Patent

Frey et al.

[11] Patent Number: 4,734,956
[45] Date of Patent: Apr. 5, 1988

[54] FOOD CASING ARTICLE

[75] Inventors: Paul H. Frey, LaGrange; Jerome J. Rasmussen, Burbank; Fredrick C. Churchill, Oaklawn, all of Ill.

[73] Assignee: Viskase Corporation, Chicago, Ill.

[21] Appl. No.: 78,342

[22] Filed: Jul. 27, 1987

Related U.S. Application Data

[62] Division of Ser. No. 817,092, Jan. 8, 1986, Pat. No. 4,688,299.

[51] Int. Cl.⁴ .............................................. A22C 13/00
[52] U.S. Cl. ............................................ 17/33; 17/49; 53/170; 53/449; 53/550; 53/576; 493/294
[58] Field of Search ................... 17/33, 34, 35, 49, 45, 17/1 R; 53/122, 170, 449, 450, 550, 452; 493/294, 933

[56] References Cited

U.S. PATENT DOCUMENTS

| | | |
|---|---|---|
| 1,797,137 | 3/1931 | Gochnauer . |
| 2,154,521 | 4/1939 | Maxfield . |
| 2,234,054 | 3/1941 | Mason ........................ 17/45 |
| 2,326,082 | 8/1943 | Walter ....................... 17/45 |
| 2,607,696 | 8/1952 | Kunz ......................... 99/171 |
| 2,882,163 | 4/1959 | Knaff ........................ 99/109 |
| 3,497,131 | 2/1970 | Tracy ........................ 229/66 |
| 3,889,446 | 6/1975 | Simmons et al. ........... 53/28 |
| 4,047,360 | 9/1977 | Nimaev et al. .......... 53/173 X |
| 4,470,171 | 9/1984 | Rasmussen et al. ........ 17/49 |
| 4,479,283 | 10/1984 | Hollingsworth .......... 17/49 |
| 4,495,748 | 1/1985 | Rowell ................... 53/170 X |

FOREIGN PATENT DOCUMENTS

| | | |
|---|---|---|
| 898727 | 7/1984 | Belgium . |
| 175173 | 3/1986 | European Pat. Off. . |
| 637300 | 12/1978 | U.S.S.R. ................... 53/170 |

*Primary Examiner*—Willie G. Abercrombie
*Attorney, Agent, or Firm*—Roger Aceto

[57] ABSTRACT

A casing article is disclosed which includes a shirred casing having a tubular leader extending through its bore wherein one end of the leader is attachable to a web for drawing the web through the bore of the shirred casing.

20 Claims, 3 Drawing Sheets

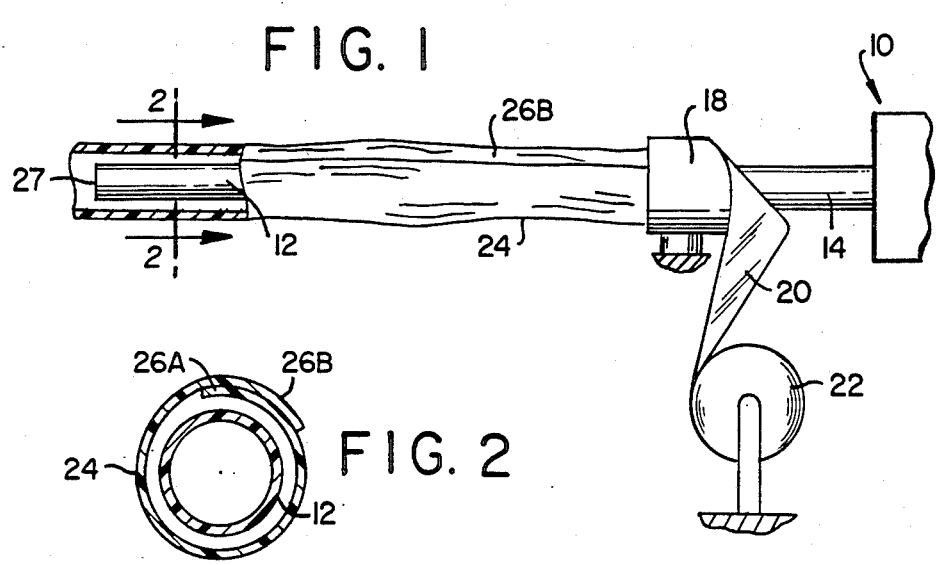
FIG. 1
FIG. 2
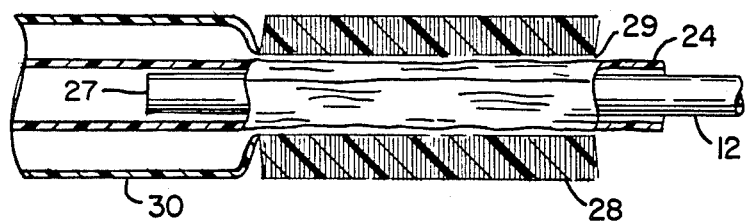
FIG. 3
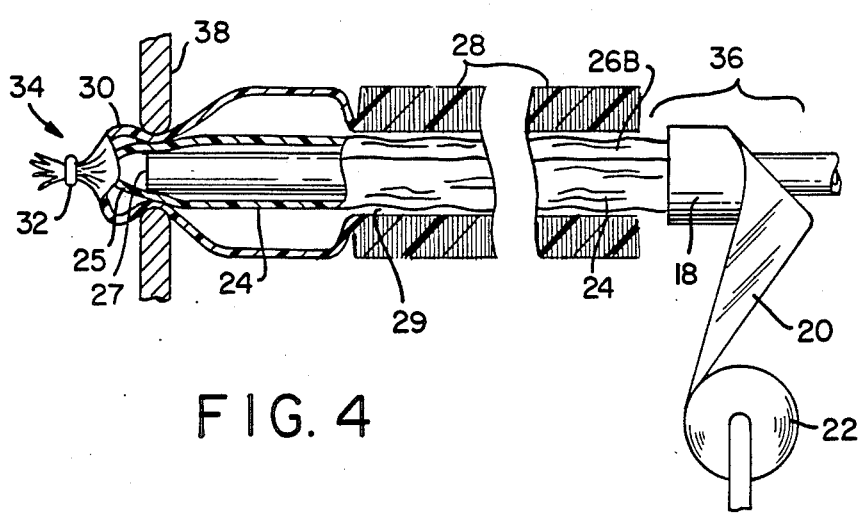
FIG. 4

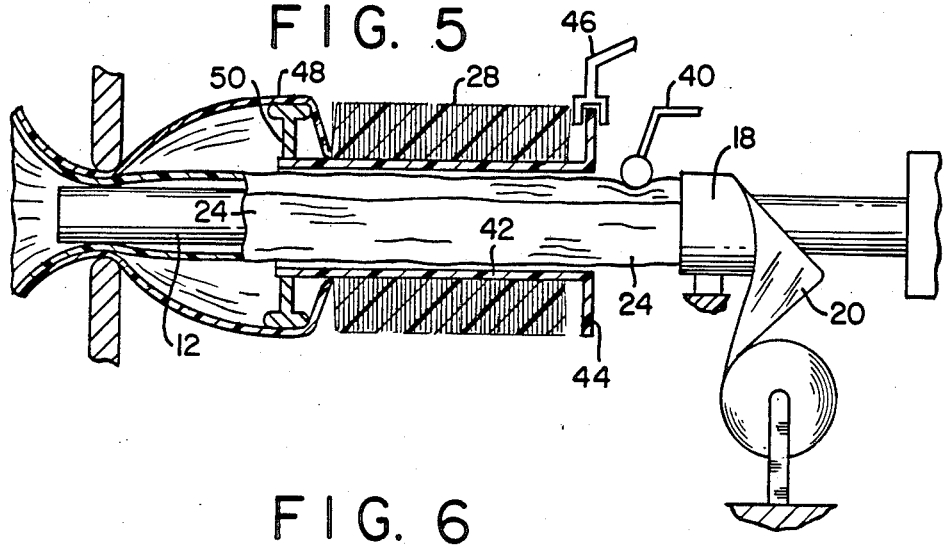
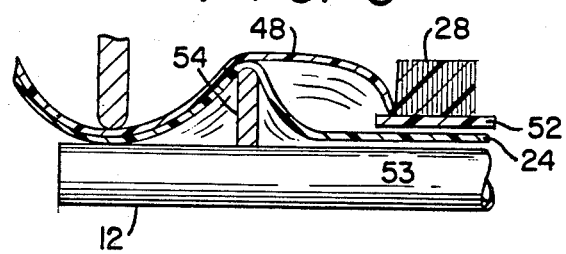
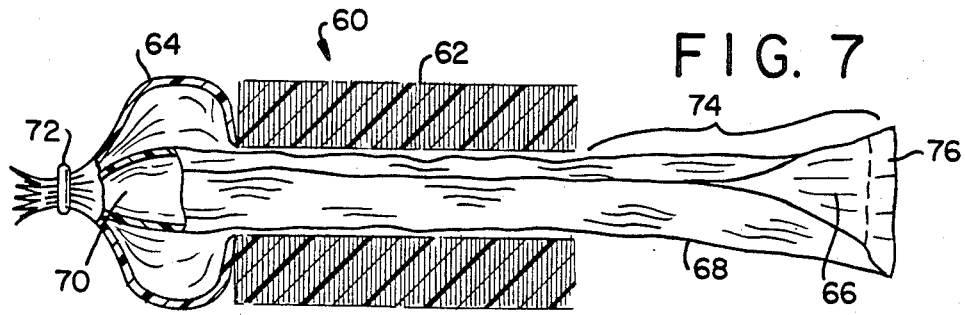
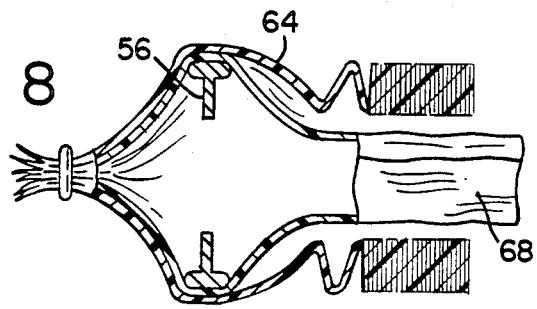

FOOD CASING ARTICLE

This application is a division of prior U.S. application Ser. No. 817,092, filed Jan. 8, 1986, now U.S. Pat. No. 4,688,299 issued Aug. 25, 1987.

FIELD OF THE INVENTION

The present invention relates to a stuffing method for producing a food product encased in a multilayered composite casing and to a casing article for use in the method.

Efficient processing plant operations such as high speed stuffing, water cooking, water shower cooling, blast freezing, or more stringent end use requirements, such as a demand for increased shelf life, requires that the casing have enhanced or a combination of desirable properties. Among the physical casing properties which can be important are physical strength and toughness, tear resistance, the ability to control stuffed size, the ability to expand and contract as the stuffed product changes size during processing, barrier properties for oxygen, moisture, oil, and the like, adhesion properties, peelability properties, and others.

However, it is difficult, or even impossible, to embody a variety of desirable casing properties into a unitary structure such as cellulosic casing. Cellulosic casing, that is casing made of regenerated cellulose, has the ability when sufficiently moisturized or premoisturized to stretch as necessary during stuffing and processing operations. It also is able to contract as the processed article loses moisture, and it possesses reasonable physical strength. A particular class of cellulosic casing, namely fibrous casing (cellulose casing reinforced with a paper or other fibrous web) is particularly useful for controlling stuffed and processed diameter, maintaining the product under pressure, and providing reasonable physical strength and toughness. Cellulosic casing is permeable to both air and moisture, which makes it both desirable for some operations such as smoking and unsuitable for others requiring an oxygen or moisture barrier.

Certain films, such as some copolymers of polyvinylidene chloride, possess excellent barrier properties. When fabricated to casings, however, these films often do not possess the strength or size control particularly associated with fibrous casing, nor are they as capable of withstanding the physical stresses imposed by many of the stuffing and processing operations.

Many stuffing applications, in fact, require both the strength and size control of fibrous casing, as well as additional properties, such as moisture or oxygen barrier properties, not inherently possessed by that variety of casing. Prior efforts to satisfy such interfering requirements have typically been by way of attempting to attach all the desired properties to a single substrate. For example, casing lengths were coated, laminated, co-extruded, or slugged in order to provide the foundation casing with properties which it inherently did not possess.

The techniques which relied upon coating, laminating, extruding, or the like, in order to place various materials onto a base, often times required tradeoffs in achieving the desired properties, thereby resulting in a deficiency in one or more desirable properties. As one example, fibrous casing coated to achieve oxygen barrier properties, while satisfactory for many applications, is not completely satisfactory for all because the barrier coating is not uniform or continuous and sometimes the coating does not adequately adhere to the fibrous casing.

Shirring complicates some of these problems in that the casing is subjected to physical punishment in the shirring operation. High speed rolls contact a continuous casing supply, say 150 feet, in order to pleat and compact it into a shirred stick of less than 2 feet. The possibility of chipping, flaking or otherwise damaging coatings, extruded layers, or laminates attached to the base is apparent.

As a solution to this problem, multilayered composite casings have been developed in order to provide the processor with a casing for his product that is not deficient in any desirable characteristic. Such composite casings are more fully disclosed in U.S. Pat. No. 4,470,171, German Patent Application No. 3,012,622 and Belgian Pat. No. 898,727. These each disclose composite shirred casing articles composed of two or more tandem mounted shirred casing lengths wherein one length is deshirred either over or through the bore of the other during stuffing to form the composite casing. Each of the shirred lengths possesses one or more of the desired properties so that the resulting multilayered composite casing has the optimum characteristics for any given stuffing and processing operations.

The casing articles made, for example, according to U.S. Pat. No. 4,470,171 allow for the combination of different shirrable materials, such as a cellulosic fibrous casing and a noncellulosic casing, such as a polymeric film.

Instead of using one relatively long shirred casing length, the casing articles of the '171 Patent require that a plurality of shirred casing lengths or "shirred sticks" be mounted in tandem to a stuffing horn. Each shirred stick takes up space along the stuffing horn so there is a shorter stuffable length of casing available for making the resulting composite casing. This means that the time of continuous operation is shortened and the down time of the machine is increased due to the need to resupply the machine with shirred sticks at more frequent intervals.

Casing materials most commonly used are extensible, that is, they have the ability to tolerate stretching during stuffing. In some stuffed products, it is important to have a wrinkle-free appearance so that in addition to extensibility, the casing materials must have sufficient shrinkability (if the product shrinks during processing) so that the casing can contract or shrink to remain taut about the product. Accordingly, for a wrinkle-free appearance, the extensibility and shrinkability characteristics of all the casing materials in the composite casing as disclosed in the '171 Patent need to be selected to insure that these characteristics are coordinated to the circumference of the product during stuffing and subsequent processing.

DESCRIPTION OF THE INVENTION

In the present invention an inner layer of composite casing is made of material drawn from a coil or roll containing a supply of an appropriate casing material such as a web, film or foil. The material drawn from the coil or roll is formed to a casing tube by overlapping its longitudinally extending side margins about the stuffing horn. The web tube, formed in this manner is passed along the stuffing horn during stuffing.

An outer layer of the composite web is made of deshirred casing drawn from a shirred stick mounted to the stuffing horn and over the web tube so that the web tube passes through the bore of the shirred stick. With this arrangement, more of the horn length is available to accommodate a single shirred stick that provides but one layer of the subsequently formed multilayered composite casing.

Consequently, the need to resupply the machine with shirred casing occurs at less frequent intervals than if several shirred sticks are tandem mounted on the stuffing horn so that longer production runs are possible with the present invention. The invention also permits use of materials which do not lend themselves to shirring or which are not commonly used as food casings in a stuffing operation such as metallic foils or polymeric films which have little or no extensibility. The invention also permits use of materials which are not commonly sold in tube form such as certain cling wraps, coated cellophane or waxed paper. Also useful in the invention are materials which are coated wherein the coating makes it difficult or impossible to shirr the casing material. This would occur, for example, where the coating cracks or otherwise becomes damaged during the shirring process.

The invention also provides a lower cost basis for the resulting composite casing because it eliminates the cost of shirring and packaging all of the casing components needed to make up the composite casing and instead supplies some of the casing material as roll stock. Using material from a continuous roll to form the inner layers of the composite casing is less expensive than using an equivalent length of shirred casing. It also has the advantage of productivity and of efficiency over the use of shirred casing in that the roll stock requires less handling than shirred casing. Also, a much longer length of casing material can be contained in a single roll than can be contained on a single shirred stick. Accordingly, a single roll of casing material would be sufficient to accommodate a plurality of shirred casing lengths so that all that need be replaced or resupplied to the stuffing machine is the shirred casing.

The shirred casing which is mounted to the stuffing horn is conventional and can be any fibrous or non-fibrous cellulosic casing which is a continuous unbroken tubular wall. The shirred casing, as also known in the art, can be provided with various coatings to provide it with desirable properties or to enhance properties which the casing already possesses.

Diverse materials can be used for the rolled stock. Examples of suitable materials include, but is not limited to, a foil, an extensible or non-extensible polymeric film, a film or foil coated or laminated to provide specific barrier properties or a porous material impregnated with a flavoring, a coloring agent or a preservative. The only criterion for the material used is that it must be food compatible. Accordingly, as used hereafter, the term "web" will be used when referring to the casing material supplied as rolled stock.

In one embodiment of the present invention, the shirred casing article mounted to the stuffing tube includes a leader in the form of a web tube which is predisposed within the bore of the shirred casing. The operator simply attaches an aft end portion of the leader to the leading end of the web drawn from the roll. This saves the steps of drawing material from the roll forward along the stuffing horn to the discharge end prior to mounting the shirred casing to the horn.

A shirred casing stick having a tubular leader extending through the bore of the stick constitutes an embodiment of a casing article of the present invention. A preferred casing article of the invention includes the shirred casing mounted on a sleeve, a forming device for wrapping web stock about the stuffing horn and a tubular leader extending through the bore of the sleeve. The stuffed product as made by the method of the present invention has an inner casing layer of a non-shirred material which has overlapped side margins defining a longitudinally extending seam and an outer layer of a seamless deshirred cellulosic casing, the two layers being closed and joined together at the ends of the product.

SUMMARY OF THE INVENTION

A casing article of the present invention can be characterized by:

(a) a shirred length of casing having an axial bore of sufficient diameter to receive a stuffing horn therethrough, said shirred length having an aft end and a fore end and having an unshirred portion of casing extended forward from said fore end;

(b) a diametrically expandable tubular leader disposed in the bore, the tubular leader having fore and aft end portions extending axially outward from the bore; and (c) the aft end portion constituting means for attaching to the tubular leader the leading end of a continuous web which is formable to a web tube about the stuffing horn and which is drawable through the bore of the shirred casing by the leader.

A stuffed product according to the present invention is characterized by:

(a) an outer layer composed of a tubular wall of deshirred cellulosic casing;

(b) an inner layer composed of non-shirred material having overlapped side margins defining a longitudinally extending seam;

(c) said inner layer being pressed diametrically outwardly against said outer layer; and (d) said inner and outer layer being closed and joined together at the ends of the stuffed product.

DESCRIPTION OF THE DRAWINGS

FIG. 1 is a diagrammatic elevation view of a portion of an stuffing apparatus illustrating use of the present invention;

FIG. 2 is a view taken along line 2—2 of FIG. 1;

FIGS. 3 and 4 show a portion of the stuffing horn to illustrate subsequent steps in the use of the present invention;

FIG. 5 is a diagrammatic view showing stuffing underway in order to illustrate another embodiment of the invention;

FIG. 6 shows a portion of the stuffing horn and a casing article to illustrate still another embodiment of the invention;

FIG. 7 shows still another casing article of the present invention;

FIG. 8 shows the casing article of FIG. 7 with an implanted sizing means;

DESCRIPTION OF PREFERRED EMBODIMENTS

Figure 9:
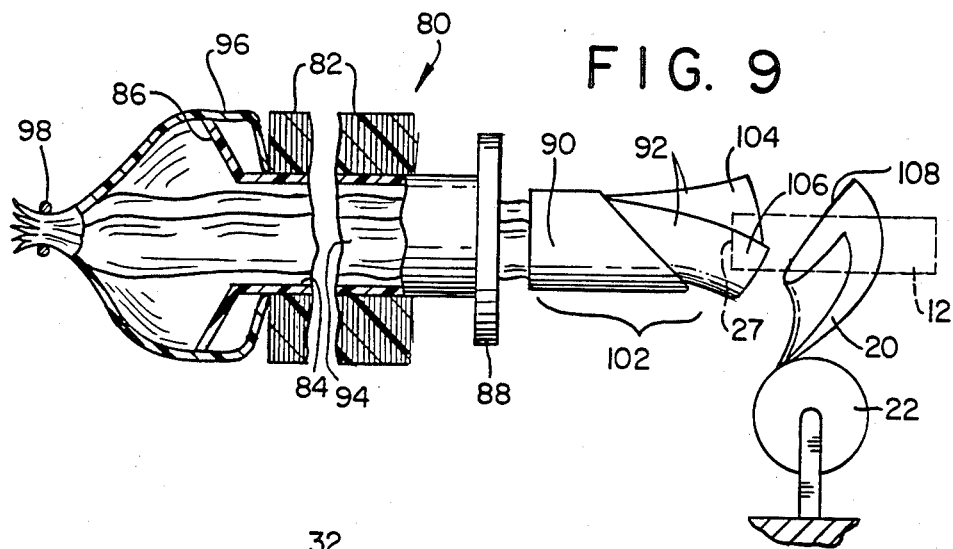
FIGS. 9 and 10 show still other embodiments of casing articles of the present invention.

The present invention maybe understood with reference to FIGS. 1-4 in which FIG. 1 shows a portion 10 of a stuffing machine including a stuffing horn 12.

Disposed about stuffing horn 12 towards its inlet or aft end 14 is a tube forming means 18. The tube forming means 18 forms a continuous web 20, supplied to the forming means from a rolled supply of flat web stock 22, into a web tube 24. Forming means 18 accomplishes this in a manner known in the art. It is sufficient to say that tube forming means 18 takes the entering flat web 20, wraps it about the stuffing horn 12 and overlaps the laterally extending side margins 26A, 26B of the web (FIG. 2) to form the web tube 24 having a longitudinally extending seam defined by the overlapping side margins. Web tube 24, formed in this manner about the stuffing horn, is drawn forward along the stuffing horn and over the discharge end 27 of the stuffing horn.

Web 20 can be of any suitable material which is food compatible and is selected for one or more desirable casing characteristics. For example, the web can be a metal foil or a polymeric material having oxygen and/or moisture barrier properties, a material which is peelable from the product within the casing after processing, a material which adheres to the product, or a material which is impregnated with liquid smoke, or other flavorings or colorants, transferrable to the product within the casing. The material of web 20 can be extensible, that is it can stretch beyond its original size without rupture. However, extensibility is not necessarily a requirement so that the material of web 20 can be substantially non-extensible.

The web tube 24 is drawn forward over the discharge end 27 of the stuffing horn and a supply of shirred casing 28 is placed over the stuffing horn 12 (FIG. 3). Any appropriate casing material can be used for the shirred casing 28, but a cellulosic casing, such as one having a fibrous web in the casing wall (fibrous casing), is preferred. The shirred casing 28 has an internal axial bore 29 sufficient to accommodate passage of both the stuffing horn 12 and the web tube 24 on the stuffing horn. The web tube 24 passes through this bore 29 and is confined between the shirred casing and the stuffing horn 12.

An initial portion of casing from the shirred supply 28 is pulled forward (as shown at 30) so that it extends over the discharge end 27 of the stuffing horn. As shown in FIG. 4, this casing portion 30 (which is either unshirred or deshirred web) is merged with the casing tube 24 forward of the discharge end 27 and the two are joined or closed by a clip 32 to form a closed end generally indicated at 34. The clip is applied by a clipper mechanism which is conventional and it need not be described in detail. At this point it should be appreciated that web tube 24 has a fore end 25 merged with casing portion 30 and has an aft end portion 36 extending outward from the internal axial bore 29. This web tube aft end portion 36 constitutes a transition zone in which the web 20 that is drawn from supply 22 is formed by forming means 18 into the web tube passing into and through the axial bore 29. Thus, the casing tube 24 can be said to emanate from the web supply 22.

A ring 38 is brought into position to snug the composite casing to the stuffing horn. Ring 38 also is conventional in the art and it acts as an emulsion seal to prevent food product from flowing back over the discharge end of the stuffing horn. The ring also functions as a brake to retard the advance of casing during stuffing.

During the stuffing operation, a food product is discharged into the closed end 34. This deshirrs casing from the shirred length 28 and simultaneously draws forward the deshirred casing and the web tube 24 to provide a multilayered composite casing for the food product comprising an outer layer of deshirred casing drawn from the shirred supply 28 and an inner layer of casing formed from web 20.

Stuffing pressure causes the laterally extending side margins 26A, 26B of the web tube to slip one relative to the other so that the web tube is diametrically expanded. If the casing tube 24 is made of a non-extensible material, this slippage will be greater than if the web is made of an extensible material. In either case the diametrical expansion continues until the web tube is pressed against the deshirred casing and further expansion is resisted by the deshirred casing which circumscribes the web tube.

After a desired length of the composite casing is stuffed, the clipper mechanism (not shown) is again activated in a conventional manner to apply a pair of clips to the casing. One clip closes the trailing end of the stuffed product while the second clip forms the leading end of the next product to be stuffed.

FIG. 5 illustrates a means 40 provided to seam the previously described overlapped side margins 26A, 26B (FIG. 3) of the web tube 24. Depending upon the nature of the material of the web 20 which is used to form the web tube, the means 40 can be any appropriate joining means, such as, for example, a sewing device for stitching the side margins closed, a heater for welding the margins together or an applicator for applying an adhesive to adhere the margins together. In any event, the means 40 forms a closed longitudinal seam (not shown) in the web tube. Preferably, when a closed seam is formed in the web tube, the material of the tube is extensible so that it can stretch diametrically responsive to the stuffing pressure.

FIG. 5 also illustrates an arrangement wherein the shirred casing 28 is disposed on a sleeve 42. Sleeve 42 has a flange 44 at its aft end which is connectable to a reciprocally operable slacker mechanism 46 of the stuffing machine. Such a slacker mechanism is conventional and it will reciprocate the sleeve 42 forward and rearward at appropriate times in the stuffing cycle in order to provide slack in the deshirred casing in a manner which is conventional in the art.

FIG. 5 further shows the deshirred casing 48 from the casing supply 28 passing over a sizing means 50. The sizing means 50 diametrically sizes or expands the deshirred casing 48 prior to stuffing. Depending upon the desired result, the sizing means is selected to just open and smooth the deshirred casing, or it is selected to circumferentially stretch the casing to a size larger than its unstretched size.

Sleeve 42 either is a integral part of the stuffing machine or, preferably, it is part of a casing article wherein the shirred casing 28 grips tightly about the sleeve 42 so that the sleeve and shirred casing 28 are mounted as a unit over the stuffing horn 12. If the sleeve 42 is a component of the stuffing machine, then sizing means 50 would be removable from the sleeve to permit mounting the casing supply to the sleeve.

FIG. 6 illustrates both the deshirred casing 48 and web tube 24 undergoing a sizing operation prior to stuffing. Here the shirred casing 28 is disposed on a sleeve 52 and the sleeve is placed over the stuffing horn 12. A sizing means 54 is attached to the stuffing horn 12 for diametrically stretching both deshirred casing 48 and the web tube 24 which are drawn forward over the sizing means. Passing both the deshirred casing 48 and the web tube 24 over the sizing means is preferred as it will assist in excluding air from between the two casing materials. If the web tube 24 is seamed, it should be extensible in order to allow the tube to stretch diametrically as it passes over the sizing means. If the web tube 24 is unseamed, it need not be made of an extensible material and expansion is accommodated, instead, by slippage of the web tube side margins one with respect to the other. Moreover, if the side margins of the web tube are not sealed, the holdback resulting from passing both materials over the sizing means is no greater than the holdback resulting from passing only the cellulosic casing over the sizing means. This is because the web tube 24 readily expands by slippage of its overlapped side margins so that there is little or no resistance to its passage over the sizing means.

Figure 11:
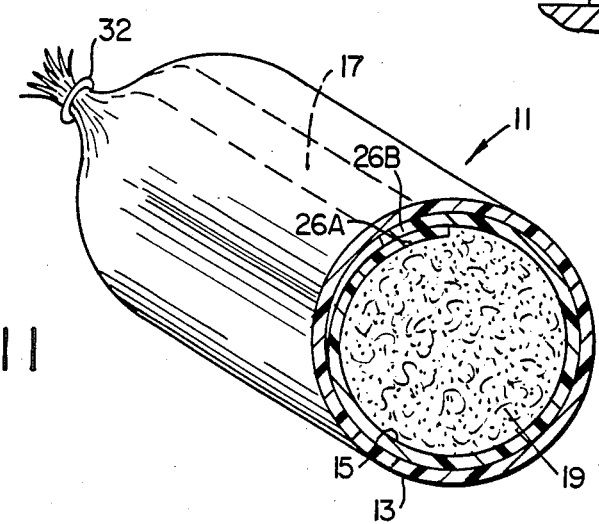
FIG. 11 is a perspective view showing in cross section a stuffed food product of the present invention.

Illustrated in FIG. 11 is a stuffed product 11 having a multilayered composite casing as made using the article of the present invention. FIG. 11 shows that the product 11 has an outer layer 13 of a deshirred, cellulosic casing. This outer layer forms a tubular wall. An inner layer 15 of the product is made of non-shirred material. The side margins 26A, 26B of the inner layer are overlapped and define a longitudinally extending seam 17 which can be either sealed or unsealed. At both ends of the product, only one of which is shown, the inner and outer layers are closed and joined together by a closure means such as a clip 32, also shown in FIG. 4. It should be appreciated that the inner layer 15 is expanded outwardly by the pressure of the food product 19 and is pressed against the outer layer 13. It also should be appreciated that in FIG. 11 the thickness of both layers is exaggerated for clarity.

FIG. 7 shows a composite casing article 60 representing one embodiment of the present invention. The article includes a shirred casing 62 having an unshirred casing portion 64 extended forward from the fore end of the shirred casing. Disposed within the bore of the shirred casing is a web 66 formed to a web tube 68. The tube has a forward portion 70 which merges with the unshirred web portion 64 and the two are closed by a clip 72. An aft end portion 74 of the casing tube extends out of the bore of the shirred casing. This aft end portion 74 constitutes a transition zone in which web 66 is formed into web tube 68 and, in the embodiment of this FIG. 7, it also constitutes an attachment means for attaching the web tube to a web (not shown) drawn from a supply roll. Thus the web tube 68 within the bore of the shirred casing is a leader which is attachable to a web drawn from a supply roll. The attachment of this leader to the web from the supply roll can be by any suitable means such as by locating an appropriate adhesive component 76 on the leader aft end portion 74.

In use, operator simply locates the composite casing article 60 over a stuffing horn 12 of FIG. 1 so that the horn extends into and through the web tube 68. The leading edge of the web 20 is threaded through the former 18 and is joined to the leader aft end portion 74 by adhesive 76. Since the composite article 60 has one end preclosed by clip 72, stuffing can commence immediately and the web tube 68 or leader will draw the web through the bore of the shirred casing as stuffing continues.

FIG. 8 shows the composite casing article of FIG. 7 including a sizing means 56 implanted within the unshirred casing portion 64. This sizing means is attachable to the stuffing horn of the stuffing apparatus for enlarging both the cellulosic casing 64 and the web tube 68.

FIG. 9 shows another embodiment of a casing article, generally indicated at 80, of the present invention. The casing article 80 has a shirred casing 82 mounted on a sleeve 84 so the pleats of the shirred casing grip onto the sleeve, thereby forming a unitary article. The sleeve optionally has a sizing means 86 at its fore end. A flange 88 at its aft end is for connection to a stuffing machine (not shown). Also attached to, or formed integral with the aft end of the sleeve is a former 90 similar to the former 18 of FIGS. 1, 4 and 5. Passing through the former is a web 92 which is formed thereby into a tubular leader 94 which extends through the bore of sleeve 84.

The shirred casing 82 has an unshirred portion 96 which extends over sizing means 86 and which merges with the tubular leader 94 at a point forward of the sizing means. A clip 98 at this point closes the end of the unshirred casing and joins it to the leader.

An aft end portion 102 of leader 94 extends through the former 90 in an aft direction and defines a transition zone in which the web 92 is a formed into the tubular leader 94. The lateral side margins 104, 106 of the web extending from former 90 are not yet overlapped so they are joined easily to leading edge 108 of a web 20 drawn from a rolled supply 22.

In use, the casing article 80 is axially aligned with a stuffing horn 12, a portion of which is shown in dotted line. The casing article 80 then is slipped over the horn so that the horn extends axially through the former 90 and the tubular leader 94 to position the discharge end 27 of the stuffing horn forward of the sizing means 86 (see, for example, the position of the stuffing horn in FIG. 5).

The operator then attaches the web aft end portion 102 to the web roll leading edge 108. When stuffing begins, tubular leader 94 draws the web 20 through former 90, thereby forming the web into a web tube. When, during the course of stuffing the supply of shirred casing 82 is exhausted, the stuffing operation is stopped and the web 20 is severed just aft of former 90. The sleeve 84, now empty of shirred casing, the former 90 and a section of the web tube within the sleeve are removed and replaced by another casing article 80. The severed edge of the web 20 is attached to the aft end of the new leader and the stuffing operation is repeated.

Figure 10:
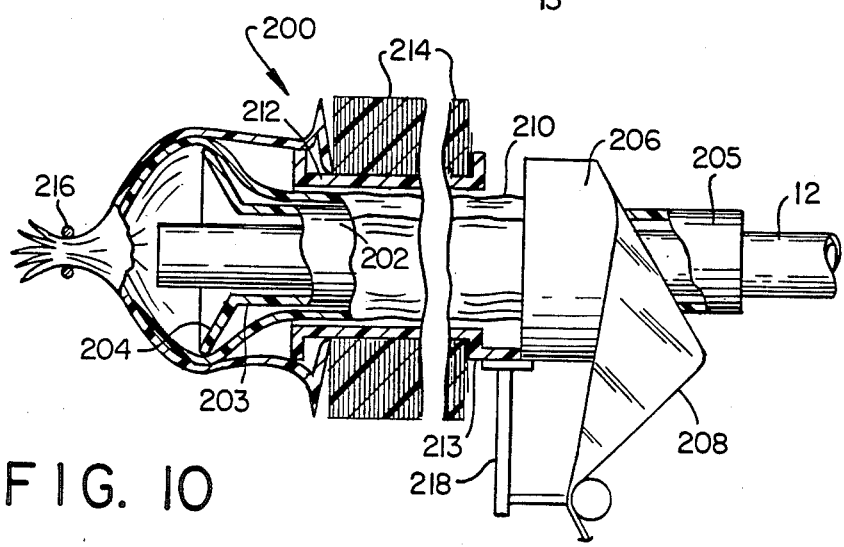

A further embodiment of the article is illustrated in FIG. 10. This embodiment is most preferred in that it incorporates both a tube forming means and a sizing means into the article, wherein the sizing means diametrically stretches both the deshirred casing and the web tube. Thus, the casing article 200 of FIG. 10 includes a sleeve 202 which has a sizing means 204 at its fore end 203. The other end 205 of sleeve 202 is attachable to the stuffing machine.

A second sleeve 212 is disposed about sleeve 202 and has at its aft end 213, a tube forming means 206.

A web portion 208 extends through the forming means 206 and is wrapped thereby about sleeve 202 so as to form a tubular leader 210. This leader extends between the two sleeves 202, 212 and along sleeve 202 and over sizing means 204 as shown.

Second sleeve 212 carries a supply of shirred casing 214. A portion of the shirred casing is drawn forward and also passes over sizing means 204 so that the leader 210 and casing merge at the sizing means. Forward of the sizing means 204, the leader and casing are closed and joined together by a clip 216.

A bracket 218 extending from the tube forming means 206 serves to attach the casing article 200 to a stuffing machine (not shown).

In use, the casing article 200 is mounted over a stuffing horn 12 (shown in dotted line) and attached to the stuffing machine (not shown). The web portion 208 is then attached to the leading edge of a coiled or rolled supply (not shown) so that during stuffing, the leader 210 will pull web through the forming means 206.

Thus, it should be appreciated that the present invention provides a stuffing method which uses, to best advantage, both shirred casing and non-shirred web stock in the manufacture of stuffed casing products. Casing deshirred during the stuffing operation and a web tube made from the web stock are united on the stuffing horn to produce a multilayered composite casing having enhanced properties derived by selecting and matching casing and web materials which individually possesses less than all the desirable casing properties. Moreover, by uniting the deshirred casing and web materials at the stuffing horn, the space available for shirred casing is not compromised.

While the description of the invention has been directed to the formation of a composite casing having two layers (i.e., one layer formed from deshirred cellulose casing and one layer formed from web stock), it should be appreciated that several webs can be fed to the stuffing horn to provide a number of casing tubes, one within the other, so that the composite casing will have more than one non-shirred layer.

Also, several shirred casing sticks can be placed in tandem on the stuffing horn as taught in U.S. Pat. No. 4,470,171 wherein one shirred casing is deshirred through the bore of another shirred casing stick. This will produce a composite casing having more than one deshirred layer. However, use of tandem mounted sticks will increase the frequency at which shirred casing must be resupplied to the machine and for this reason is not preferred.

Having described the invention in detail, what is claimed as new is:

1. A composite casing article comprising:
  (a) a shirred length of casing having an axial bore of sufficient diameter to receive a stuffing horn therethrough, said shirred length having a fore end and an aft end and an unshirred portion of casing extended forward from said fore end;
  (b) a diametrically expandable tubular leader in said bore, said leader having fore and aft end portions extending axially outward from said bore; and
  (c) said leader aft end portion constituting means for attaching to said leader the leading end of a continuous web which is formable to a casing tube about the stuffing horn and which is drawable through said bore by said leader.

2. A composite casing article as in claim 1 wherein said tubular leader is a web having longitudinally extending overlapped side margins.

3. A composite casing article as in claim 2 wherein said side margins are unsealed thereby rendering said tubular leader diametrically expandable by the circumferential slippage of said overlapped side margins, one with respect to another.

4. A composite casing article as in claim 2 wherein said web comprises a metal foil or a metal foil-plastic web laminate.

5. A casing article as in claim 1 including adhesive means on said leader aft end portion.

6. A casing article as in claim 1 wherein said unshirred casing portion and said leader fore end portion are merged and joined together to form a closed end of a multilayered composite casing.

7. A composite casing article as in claim 1 including:
  (a) a sleeve having a fore end, an aft end and an axial bore of a size sufficient to fit over a stuffing horn;
  (b) said shirred length of casing being disposed on said sleeve; and
  (c) said tubular leader extending longitudinally through the bore of said sleeve.

8. A composite casing article as in claim 7 including a forming means at said sleeve aft end, said forming means being operable to form a casing tube out of a web which enters said forming means and passes through said forming means and into said sleeve.

9. A composite casing article as in claim 8 wherein said tubular leader has its aft end portion extending through and rearward from said forming means.

10. A composite casing article as in claim 7 including a sizing means on said sleeve fore end for expanding casing drawn from said shirred length and over said sizing means.

11. A composite casing article as in claim 1 including:
  (a) a first sleeve disposed within and extending substantially the full length of said tubular leader, said sleeve having a fore end;
  (b) a casing sizing means on said fore end;
  (c) a second sleeve disposed coaxially about said first sleeve and tubular leader said second sleeve having an aft end spaced from said first sleeve fore end;
  (d) a forming means on said second sleeve aft end operable to form a casing tube about said first sleeve from a web passing into and then forward through said forming means towards said first sleeve fore end, and said leader aft end portion extending rearward through said forming means; and;
  (e) said shirred length of casing being disposed on said second sleeve.

12. A composite casing article as in claim 11 wherein said shirred casing length has an unshirred portion extended forward over said sizing means and said tubular leader has a portion also extended forward over said sizing means and merged with said unshirred portion.

13. A composite casing article as in claim 12 including means joining together and closing the portions of said unshirred casing and tubular leader forward of said sizing means.

14. A composite casing article comprising
  (a) a shirred length of cellulosic casing having an internal bore and an unshirred casing portion extended forward from said shirred length;
  (b) a casing tube disposed in said bore, said casing tube having a fore end merged with said unshirred casing and an aft end portion extending outward from said internal bore;
  (c) said casing tube formed of a web having overlapped side edges which define a longitudinally extending seam;

(d) a web supply from which said casing tube emanates; and (e) said casing tube aft end portion constituting a transition zone in which web drawn from said web supply is formed to said casing tube.

16. A composite casing article as in claim 14 including closure means closing said unshirred casing portion together with said casing tube fore end.

16. A composite casing article as in claim 14 wherein the length of the web in said web supply exceeds the length of said cellulosic casing in said shirred casing.

17. A composite casing article as in claim 14 wherein said longitudinally extending seam is unsealed.

18. A composite casing article as in claim 14 including a casing tube forming means in said transition zone.

19. A food product comprising a foodstuff encased in a multilayered composite casing comprising:

(a) an outer layer composed of a tubular wall of deshirred cellulosic casing;

(b) an inner layer composed of a non-shirred web material having side margins overlapped to define a longitudinally extending seam;

(c) said inner layer being pressed diametrically outward against said outer layer; and (d) said inner and outer layers being closed and joined together at the ends of said stuffed product.

20. A food product as in claim 19 wherein said longitudinally extending seam is unsealed.

* * * * *

UNITED STATES PATENT AND TRADEMARK OFFICE
CERTIFICATE OF CORRECTION

PATENT NO. : 4,734,956

DATED : April 5, 1988

INVENTOR(S) : Paul H. Frey; Jerome J. Rasmussen; Fredrick C. Churchill

It is certified that error appears in the above-identified patent and that said Letters Patent is hereby corrected as shown below:

In col. 6, line 14, change "casing" to -- web --.

In col. 7, line 46, change "web" to -- casing --.

In col. 7, line 47, change "casing" to -- web --.

In col. 8, line 27, delete the word "a".

In col. 9 line 34, change "casing" to -- web --.

Signed and Sealed this

Thirteenth Day of February, 1990

*Attest:*

JEFFREY M. SAMUELS

*Attesting Officer*   *Acting Commissioner of Patents and Trademarks*